United States Patent [19] [11] 4,128,342
Renk [45] Dec. 5, 1978

[54] MIXING APPARATUS

[75] Inventor: Paul Renk, Troisdorf, Fed. Rep. of Germany

[73] Assignee: Barmag Barmer Maschinenfabrik AG, Remscheid-Lennep, Fed. Rep. of Germany

[21] Appl. No.: 620,783

[22] Filed: Oct. 8, 1975

[30] Foreign Application Priority Data

Oct. 9, 1974 [DE] Fed. Rep. of Germany ... 7433808[U]

[51] Int. Cl.² ............................. B29B 1/06; B29B 1/10
[52] U.S. Cl. ........................................ 366/99; 366/303; 366/305; 366/307; 366/325
[58] Field of Search ............................... 259/191–193, 259/43–46, 23–26, 7–10; 425/207–208

[56] References Cited

U.S. PATENT DOCUMENTS

| 2,200,997 | 5/1940 | Royle | 259/191 |
| 3,174,185 | 3/1965 | Gerber | 259/191 |
| 3,239,882 | 3/1966 | Yokana | 259/191 |
| 3,317,956 | 5/1967 | Lippens | 425/207 |

FOREIGN PATENT DOCUMENTS

| 907789 | 1/1954 | Fed. Rep. of Germany | 259/191 |
| 841743 | 7/1960 | United Kingdom | 259/191 |

Primary Examiner—Harvey C. Hornsby
Assistant Examiner—Timothy F. Simone
Attorney, Agent, or Firm—Keil, Thompson & Shurtleff

[57] ABSTRACT

An apparatus for the mixing of materials such as synthetic polymers and their additives. The apparatus comprises a casing which surrounds a cylindrical rotor. A series of groove rings and spacer rings are axially arranged on the rotor and in the casing. The grooves formed on the peripheral surface of the groove rings are circumferentially separated by shearing lands and are bound along their longitudinal side faces by the side faces of the alternately arranged spacer rings. In assembly, the grooves formed in the rotor groove rings are arranged in a partially overlapping, axially displaced relationship with respect to the radially opposed grooves formed on casing groove rings.

6 Claims, 14 Drawing Figures

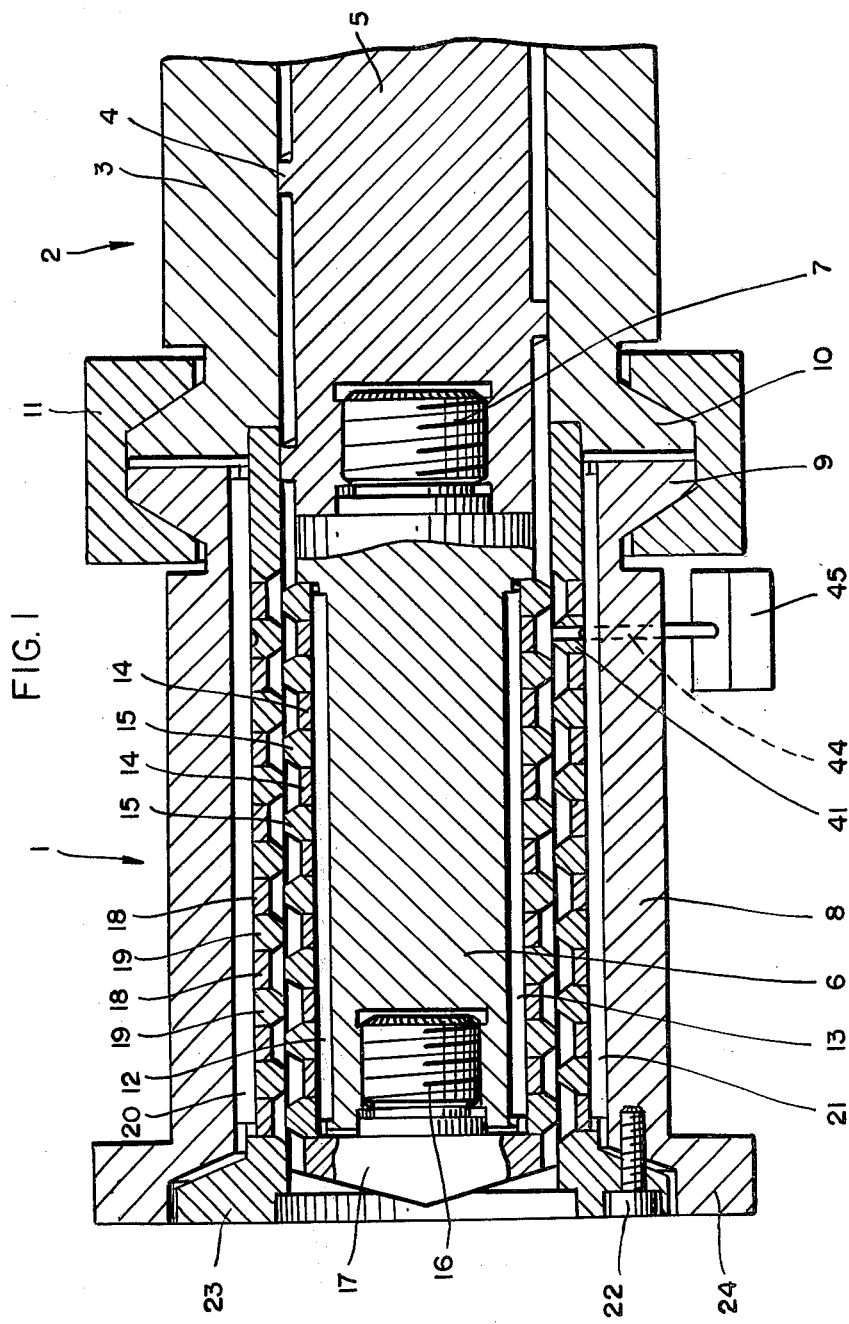

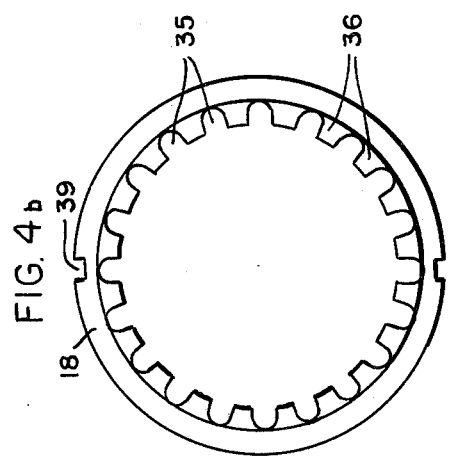
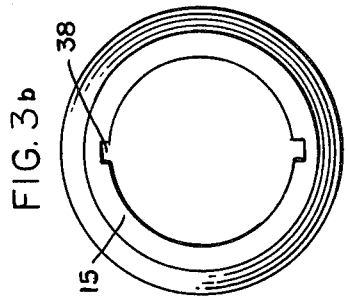
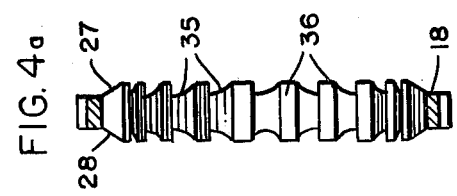
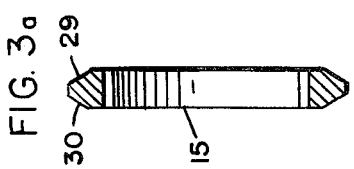
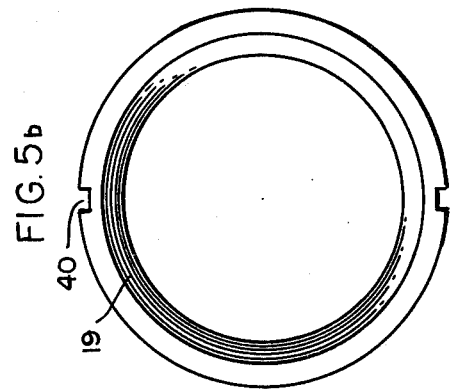
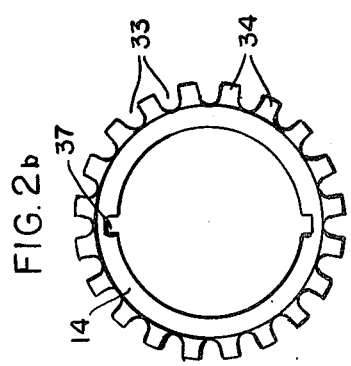
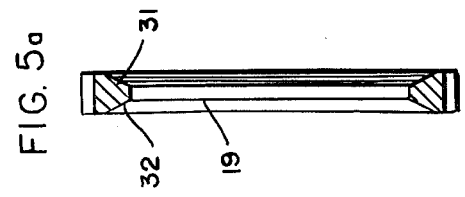
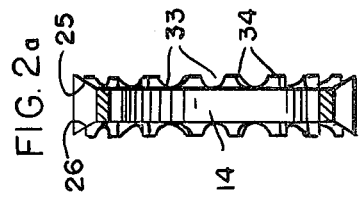

MIXING APPARATUS

INTRODUCTION

The present invention relates to an apparatus for mixing synthetic plastics, resins and the like, including their additives, and preferably, for mixing and agglomerating heterogeneous pulverulent or powdery mixtures of synthetic thermoplastic polymers. The apparatus consists generally of a drivable cylindrical rotor having a casing surrounding it. On the peripheral surfaces of the rotor and casing there are provided a system of closed grooves which are separated in the circumferential direction by shear crosspieces or lands.

BACKGROUND OF THE INVENTION

Various devices for mixing synthetic plastics, resins or polymers and their additives, which are added during the mixing process or premixed therewith, and which are especially present as fillers, lubricants, stabilizers, dyes, pigments, antistatic agents and the like, are well-known in the industry. The mixing elements used in such devices differ in construction depending upon whether a dispersive mixing (shearing, dividing) or a distributive mixing (distributing, blending) is sought to be achieved. See generally Schiedrum, Kunststoffe, vol. 63, No. 6, pp. 355–61 (1973). However, the object of such mixing is always the uniform distribution of all elements and additives, possibly added in only very small concentrations, in the base substance. It is possible for the finished mixture to take the form of a material with a solid consistency, for example as in an agglomerate, or as a homogeneous melt.

Such known mixing apparatus as are shown, for example, in German patents DT-PS 902,789, DT-PS 1,197,438, DT-PS 1,198,051 and German published application DT-AS 1,529,964, have radially intermeshing mixing or kneading elements, with one set of elements being arranged about a rotor of a screw extruder and rotating therewith, and another set of elements being mounted in a fixed position on the casing enclosing the rotor.

Mixing apparatus of the above type have an inherent drawback in that the design and arrangement of the mixing elements or disk packs do not allow for the simple disassemblage of the rotor for cleaning, inspection, repair or the like without a relatively great expenditure of time and effort spent in the dismounting and reassembly. In particular, if the radially intermeshing mixing elements are alternately mounted on the rotor and casing, rapid ejection of the rotor is not possible in any event, thereby rendering the apparatus unsuitable for the mixing of rigid polyvinyl chloride since such rapid ejection is necessarily required for the protection of the machine in the event of a power failure when working such material.

An additional disadvantage of mixing apparatus of the type disclosed in DT-AS 1,529,964 is that in order to improve the mixing effect by arranging several mixing elements on the rotor and in the casing, defined gaps must be present between the revolving and fixing mixing elements so as to assure proper mechanical functioning of the device and avoid jamming or butting of axially opposed annular surfaces. However, these axial gaps undesirably bring about variable loading of the material to be mixed in both mechanical and thermal respects and, in consequence, an uncontrolled and unpredictable flow process which prevents the optimal reproducible mixing of the materials being treated. For example, the varying mixing times of such devices in the case of thermally sensitive plastics or resins will lead to damage of mixed materials and to an inhomogenous and generally non-uniform quality of the resulting product.

In addition to the above-described devices, there are also known mixing apparatus of the type disclosed in German patent DT-PS 1,037,698 in which systems of grooves or furrows lie opposite one another and extend in axial directions along a drivable cylindrical rotor having little radial play and a surrounding casing. These groove systems are separated circumferentially by shear crosspieces or lands which do not engage one another.

However, in spite of the advantage of rapid disassembly of such devices through the axial ejection of the rotor from within the casing, such apparatus exhibit certain drawbacks in the mixing process in that the shearing and mixing of the materials with their additives takes place in an inherently uncontrollable manner and only relatively large agglomerates are ground or pulverized between the shear lands. The material passing through such devices will be essentially sheared only once in the longitudinal direction and distributed on the grooves of the rotor and casing. Beyond this initial shearing, it is left to chance whether the particles will be again subjected to a discrete shearing action as they proceed through the device since it is not necessary that radial flow of the particles take place beyond this point between the grooves and shearing lands of the rotor and casing.

A further disadvantage experienced with such mixing devices is that the groove systems are not self-cleaning so that stoppages often times occur, to the detriment of the homogeneity of the mixture and resulting product quality, as a result of, for example, a build-up of insufficiently melted agglomerates in such grooves.

The above-discussed disadvantages can largely be eliminated through an arrangement of the groove systems in the manner disclosed by U.S. Pat. No. 3,174,185. With such an arrangement several groove systems are mounted on the rotor and in the casing in axial succession and are axially shifted with respect to one another. Due to this axial interruption of the grooves, there is created in a simple manner a forced flow of the material back and forth between the groove system of the rotor and the groove system of the casing which insures improved shearing and mixing of the material as it flows through the apparatus. However, the production of such groove systems in the rotor and casing is quite expensive due to the extensive and difficult machinery required. This is especially a problem when the inside diameter of the casing is relatively small.

BRIEF DESCRIPTION OF THE INVENTION

The present invention eliminates the above-described problems and disadvantages found with known mixing devices by providing a mixing apparatus having a simple, axially disassemblable rotor and grooved systems on the rotor and in the casing which insure controllable shearing and mixing of the material flow through the device. In addition, the grooved systems of the rotor and casing are designed in such a manner that they may be inexpensively manufactured and are easily adapted to meet differing requirements for mixing quality and efficiency.

The mixing apparatus of the present invention comprises a casing which surrounds a cylindrical rotor. A series of groove rings and spacer rings are axially arranged on the rotor and in the casing. The grooves formed on the peripheral surface of the groove rings are circumferentially separated by shearing lands and are bound along their longitudinal side faces by the side faces of the alternately arranged spacer rings. In assembly, the grooves formed in the rotor groove rings are arranged in a partially overlapping, axially displaced relationship with respect to the radially opposed grooves formed on casing groove rings. Due to the modular nature of profile rings, the length and, therefore, mixing effectiveness of the apparatus may be extended to meet varying mixing requirements.

The grooves formed in the groove rings may extend in the axial direction, with their ends forming side surfaces having an equilateral trapezoid shape with respect to each other, or preferably, may be formed in an oblique angular direction with respect to the longitudinal axis of the rings thereby providing a conveying effect to the materials as they are carried through the machine. The advantages of utilizing such obliquely formed grooves in the rotor and casing are well-known in the art and such an arrangement is described, for example, at page 2, lines 101–110 of British Pat. No. 841,743.

In addition, in a preferred embodiment of the present invention, the zones of the grooves formed in the rotor groove rings where the conveyed material enters the grooves are arranged opposite the zones of the grooves formed in the casing groove rings where the conveyed material exits the grooves and vice-versa. This arrangement compells a continuous flow of the material between the rotor groove rings and casing groove rings due to the fact that the groove systems have only a limited axial length and they must, therefore, deflect the material radially at their outflow as it is conveyed through the mixing apparatus. This continuous deflection of the material over the shearing lands of the groove rings further enhances the mixing effect of the device.

The mixing apparatus of the present invention may be connected to the ejection end of a screw extruder if so desired. In such arrangements it is desirable to construct the diameter of the mixing apparatus larger than the diameter of the screw portion of the extruder since this allows a larger number of grooves to be formed on the periphery of the groove rings and increases the mixing effect by increasing the radial velocity component of the material being processed.

DESCRIPTION OF THE DRAWINGS

FIG. 1 is a longitudinal, sectional view of a mixing apparatus constructed in accordance with an embodiment of the present invention shown connected to the ejection end of a screw extruder;

FIGS. 2a, 2b are elevational and cross-sectional views of the rotor groove ring portions shown in FIG. 1;

FIGS. 3a, 3b are elevational and cross-sectional views of the rotor spacer ring portions shown in FIG. 1;

FIGS. 4a, 4b are elevational and cross-sectional views of the casing groove ring portions shown in FIG. 1;

FIGS. 5a, 5b are elevational and cross-sectional views of the casing spacer ring portions shown in FIG. 1;

DESCRIPTION OF THE PREFERRED EMBODIMENT

Figure 4C:
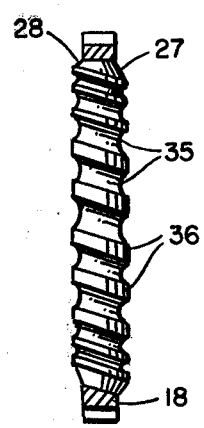
FIG. 4c is a cross-sectional view similar to FIG. 4a showing an alternate embodiment of the casing groove ring having oblique grooves formed therein.

FIG. 1 illustrates an embodiment of a mixing apparatus 1, constructed in accordance with the present invention, which is connected to the ejection end of a screw extruder 2. The screw extruder comprises generally a central root section 5 having a ridge or flight portion 4 formed about its outer surface in a continuously winding manner and an outer cylinder 3. Rotor 6 of the mixing apparatus 1 is connected at the ejection end of the screw extruder 2 by means of a bolt 7 which is mounted on a thread formed on the head of root section 5. The casing 8 of the mixing apparatus which concentrically surrounds rotor 6 is connected to outer cylinder 3 of the screw extruder by means of flanges 9, 10 formed on the abutting ends of the casing and cylinder. The flanges 9, 10 are securely joined by the usual type of clamp 11. In an alternative embodiment of the apparatus, casing 8 of the mixing apparatus 1 may be constructed as one piece with outer cylinder 3 of screw extruder 2. However, the flanged embodiment is preferred since the flexibility of the extruder is increased and the mixing apparatus may be altered at little cost to meet changed conditions by using, for example, an extended casing with a greater number of mixing elements.

On rotor 6 there are arranged in succession several inner profile rings 14, 15 which axially interlock in alternate closed linkage. Inner profile rings 14, 15 are secured on rotor 6 in order to prevent twisting thereabout by means of keys 12, 13. Profile ring 14, which is also referred to hereinafter as the rotor groove ring, is illustrated in detail in FIGS. 2a, 2b, and profile ring 15, which is also referred to hereinafter as the rotor spacer ring, is illustrated in detail in FIGS. 3a, 3b. These inner profile rings are axially secured on rotor 6 by means of an end cap 17 which is removably mounted on the end of the rotor by threaded bolt 16.

In an analogous manner, outer profile rings 18, 19 are arranged in an axially interlocking, alternate closed linkage relationship about the inner surface of casing 8. These outer profile rings are secured on casing 8 in order to prevent twisting thereabout by means of keys 20, 21. Profile ring 18, which is also referred to hereinafter as the casing groove ring, is illustrated in detail in FIGS. 4a, 4b, and profile ring 19, which is also referred to hereinafter as the casing spacer ring, is illustrated in detail in FIGS. 5a, 5b. These outer profile rings are axially secured within casing 8 by means of an inset ring 23 which is removably mounted on the end of the casing by bolts 22. On the end flange 24 of the mixing casing 8 there may be mounted an extrusion die (not shown) of a convention design which is utilized to further process the mixed materials exiting from the mixing apparatus.

The inner and outer profile rings of the mixing apparatus are illustrated in detail in elevation and cross-section in FIGS. 2 through 5. Groove rings 14 and 18 have side faces 25, 26 and 27, 28, which engage corresponding side faces 29, 30 and 31, 32 of spacer rings 15 and 19, in a snug-fitting relationship in the axial direction. The engagement of the groove rings and spacer rings is best illlustrated in the perspective view of FIG. 6.

Figure 6:
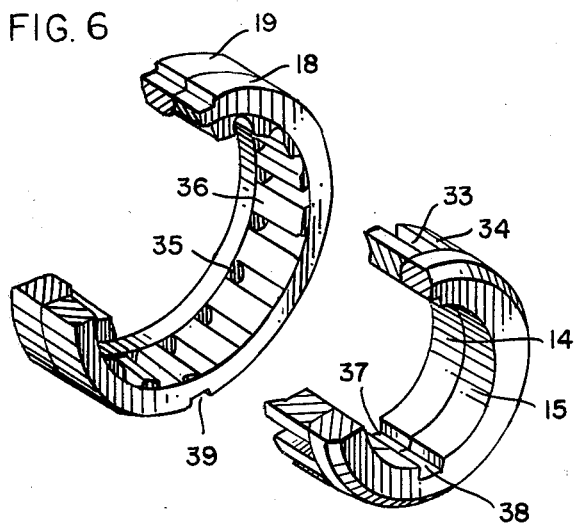
FIG. 6 is a perspective, exploded view of the axial intermeshing of the rotor groove and spacer rings with the casing groove and spacer rings.
Figure 7:
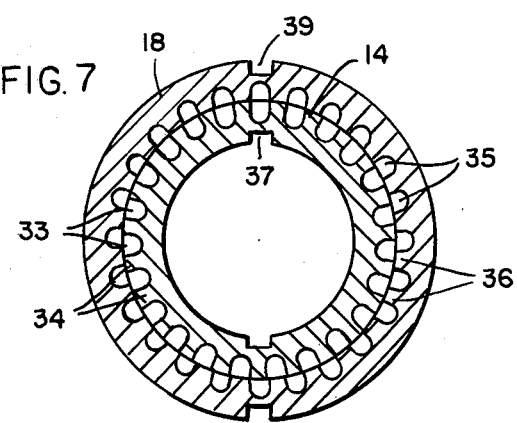
FIG. 7 is a cross-sectional view of a particular embodiment of the present invention showing the radially interacting rotor and casing groove rings having unlike groove divisions.

Referring now to FIGS. 6 and 7, groove rings 14, 18 have formed on their respective outer and inner circumferences, peripherally distributed, axially parallel longitudinal grooves 33 and 35. Grooves 33, 35 have a rounded groove base with a trapezoidal axial profile, and are circumferentially separated about the rings by shear lands 34 and 36 respectively which define the outer and inner diameters of the rings. Longitudinal grooves 33, 35 are closed along their sides by the side faces 29, 30 and 31, 32 of spacer rings 15 and 19. This enclosure of the groove rings insures that an overflow of the material to be mixed within the grooves is prevented or can only take place by shearing the material over shear lands 34, 36. In addition, as has been noted above, the conveying effect imparted to the material as it passes through the machine may be increased if desired by forming grooves 33, 35 in an oblique angular direction, as is shown in FIG. 4c, with respect to the longitudinal axis of rings 14, 18. The above-mentioned keys 12, 13 and 20, 21 engage longitudinal keyway grooves 37, 38 and 39, 40 respectively in order to prevent twisting of the rings about the rotor and casing.

All of the inner profile rings 14, 15 have the same outside diameter. Their outer diameter is slightly smaller than the inner diameter of outer profile rings 18, 19 in order to accommodate the small radial play of the rotor. The width of the rings is preferably such that in the casing and on the rotor a spacer ring and a groove ring will always have the same total width. The length of the shearing zone is dependent on the selected length of the groove inlet and groove outlet zone and is yielded from the side face angle of the profile rings.

FIG. 6 illustrates the assembly of the inner and outer groove and spacer rings in perspective representation. It is to be noted that the profile rings engage one another snugly and that the groove systems provided in groove rings 14 and 18 are bound axially by spacer rings 15 and 19 respectively.

The radial interaction of the inner and outer profile rings is shown in FIG. 7. Groove rings 14 and 18 have unequal corresponding groove divisions so that at every angular position of the rotor with respect to the casing there will be present a flow connection for the material stream for at least some of the radially opposed grooves. This effect also can be achieved by a slight overlapping of the grooves peripherally, for example, by providing a different groove widths for the rotor groove rings and casing groove rings when an equal number of grooves are formed in each.

As is shown in FIG. 1, the profile rings on both the rotor and casing are arranged in an alternate sequence so that opposite each groove ring on the rotor there lies a spacer ring in the casing and vice-versa. In this manner material flow is assured through the deflection of the material back and forth from the exit zones of the groove system of the rotor into the corresponding entry zones of the groove system of the casing and from the casing back to the rotor, etc. The above entry and exit zones being that portion of each groove adjacent spacer rings 15 and 19 of the rotor and casing respectively into which the material enters the groove and from which it exits the groove as the material stream passes through the machine. Due to the axial displacement of the groove rings by the spacer rings on both the rotor and casing, it is impossible for the material to undesirably flow between groove systems lying one after the other on either the rotor or casing.

Figure 8A:
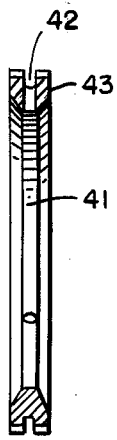
FIGS. 8a, 8b are elevational and cross-sectional views of a particular embodiment of the present invention showing the casing spacer ring having a ring groove and radial bores for the feeding of additives during the mixing process.
Figure 8B:
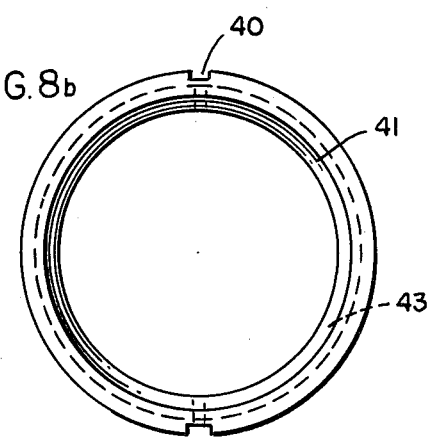

Referring to FIGS. 1 and 8, if it is desired to mix a liquid, waxy or pasty additive to the synthetic polymer or plastic material to be mixed in the apparatus, then it is advantageous to utilize a special spacer ring 41 which is positioned at the front or beginning end of the mixing apparatus in casing 8. Special spacer ring 41 has the same width and other dimensions as the casing spacer rings 19 described above and only differs from these rings in that it has an annular channel 42 about its outer circumference from which one or more radial bores 43 lead to the inner periphery of the ring. Annular channel 42 is connected to a bore 44 formed in the casing of the mixing apparatus through which the additives, such as dye pigments, stabilizers or antistatics, are fed by means of a suitable, conventional metering pump 45. In this manner the additives may be mixed into the material conveyed into the mixing apparatus 1 by the screw extruder 2.

As has been indicated above, the mixing apparatus of the present invention may be utilized to form a wide variety of filamentary yarns which may be spun to produce numerous types of products. For example, in the formation of nylon filamentary yarns which are to be spun in the production of rug or carpet floor coverings, an extruder with a 90 mm screw diameter is utilized for the processing of 190 kg/hr of nylon 6 (polycaprolactam) having a solution viscosity of 2.6 (corresponding to a viscosity of 3,560 poise at 265° C. or 2,890 poise at 275° C.) to which a 5% by weight antistatic is to be mixed.

The processing data for this operation is as follows:
Melt temperature at the extrusion die = 290° C.
Screw speed = 80 rpm
Melt pressure at the extruder end = 80 atm
Length of extruder (Screw diam. = D) = 24 D For the admixing of the antistatic, a special spacer ring constructed in accordance with the invention is utilized. The structural data for the mixing apparatus is as follows:

Number of grooves or lands per profile ring = 40
Number of casing groove rings = 11
Number of rotor groove rings = 10

The following operational values are provided with the mixing apparatus:

Melt volume contained in the mixing apparatus = V = 1,117 cm$^3$

Average retention time in the mixing apparatus = $\frac{1,117 \text{ cm}^3}{2,800 \text{ cm}^3/\text{min}}$ = 0.481 min.

Since the melt is distributed or split up at the entry and exit section of each mixing ring, a total of 22 shearings, cuttings, or sectionings of the melt are provided with 11 elements. The number of shearings per minute is derived from the number of shearings × number of teeth per mixing ring × rotational speed of the apparatus, i.e., 22 × 40 × 80 or 70,400 shearings per minute.

The output capacity per groove is given by:

$$\frac{\text{Output in kg/hr}}{\text{No. of grooves per ring}} = \frac{190{,}000 \text{ g}}{3{,}600 \times 40 \text{ grooves}} = 1.32 \text{ g/groove}$$

The particle weight per shearing is provided by:

$$\frac{\text{Output per groove}}{\text{No. of shearings per second}} = \frac{1.32}{6.4} = 0.206 \text{ g/groove/shearing}$$

In the above equation, the number of shearings per second was determined as follows:

$$\frac{\text{Screw speed} \times \text{No. of grooves in ring}}{60 \text{ sec.}} = \frac{80 \times 40}{60} = 6.4 \text{ shearings per sec.}$$

With the specific weight of nylon 6 being $\gamma = 1.0$ g/cm$^3$, there is provided a particle volume per cutting of 0.206 cm$^3$/g. From this Figure, a coefficient measure for the homogeneity of the nylon melt and the dispersing effect in the stream may be determined. With a groove cross-section of 37 mm$^2$, the layer thickness of the melt sheared at the rings, or sectioned into small disk-like shapes, and distributed about the ring circumference, may be determined as follows:

$$f = \frac{0.206 \times 10^3}{37} = 0.0057 \times 10^3 \text{mm} = 5.57 \text{ mm.}$$

The above layer thickness measure can be varied as desired by changing the number of grooves formed in the mixing rings, the speed of the rotor or screw, or the total number of groove rings utilized in the mixing apparatus.

While several particular embodiments and examples of the present invention have been shown and described, it should be understood that various obvious changes and modifications thereto may be made, and it is therefore intended in the following claims to include all such modifications and changes as may fall within the spirit and scope of this invention.

What is claimed is:

1. An apparatus for mixing materials such as synthetic polymers and their additives, said apparatus comprising:

a casing surrounding a cylindrical rotor, a series of profile rings consisting of groove rings and spacer rings axially arranged in alternating sequence on said rotor and is said casing which are in snug axial engagement with one another, said groove rings having grooves formed in their peripheral working surfaces which are circumferentially separated by shearing lands and which are limited in an axial direction by the end surfaces of said spacer rings abutting upon the end surfaces of said groove rings, said shearing lands and end surfaces defining said grooves as a series of individual closed chambers, and said grooves formed on said rotor groove rings being arranged in a partially overlapping, axially displaced relationship with respect to the radially opposed grooves formed on said casing groove rings so that the material will flow between said overlapping rotor and casing closed groove chambers thereby causing repeated dispersal of the material as it moves through the mixing apparatus.

2. The mixing apparatus of claim 1 wherein said grooves are formed in said groove rings in an axial direction with the ends of said grooves forming side surfaces having an equilateral trapezoid shape with respect to each other.

3. The mixing apparatus of claim 1 wherein said grooves are formed in said groove rings in an oblique direction with respect to the axis of said rings thereby providing a conveying effect to said materials.

4. The mixing apparatus of claim 1 wherein said grooves have a material entry zone and a material exit zone, the groove entry zones of the grooves formed in the rotor groove rings being arranged opposite to the groove exit zones of the grooves formed in the casing groove rings and, in a corresponding manner, the groove entry zones of the grooves formed in the casing groove rings being arranged opposite the groove exit zones of the grooves formed in the rotor groove rings.

5. The mixing apparatus of claim 1 wherein said motor and casing are connected to the ejection end of a screw extruder, the central root section of said screw extruder being arranged to rotatably drive said rotor.

6. The mixing apparatus of claim 1 wherein said spacer rings further comprise a special spacer ring mounted in the casing having a bore formed through it in a radial direction which permits said additives to be introduced to the material as it is being mixed.

* * * * *

UNITED STATES PATENT AND TRADEMARK OFFICE
CERTIFICATE OF CORRECTION

PATENT NO. : 4,128,342

DATED : December 5, 1978

INVENTOR(S) : Paul Renk

It is certified that error appears in the above-identified patent and that said Letters Patent are hereby corrected as shown below:

In column 8, line 39, in Claim 5:
change "motor" to read --rotor--.

Signed and Sealed this

Twenty-sixth Day of June 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,128,342

DATED : December 5, 1978

INVENTOR(S) : Paul Renk

It is certified that error appears in the above-identified patent and that said Letters Patent are hereby corrected as shown below:

In column 8, line 1, in Claim 1:
change "and is said" to --and in said--.

In column 8, line 39, in Claim 5:
change "motor" to read --rotor--.

THIS CERTIFICATE SUPERSEDES CERTIFICATE OF CORRECTION ISSUED June 26, 1979.

Signed and Sealed this

Ninth Day of October 1979

[SEAL]

Attest:

RUTH C. MASON
Attesting Officer

LUTRELLE F. PARKER
Acting Commissioner of Patents and Trademarks